United States Patent [19] [11] 3,868,012
Kinsley [45] Feb. 25, 1975

[54] CONTAINER ORIENTING APPARATUS
[75] Inventor: Lewis H. Kinsley, New Britain, Pa.
[73] Assignee: Kinsley Corporation, Trevose, Pa.
[22] Filed: Mar. 30, 1973
[21] Appl. No.: 346,674

[52] U.S. Cl. ................................ 198/276, 198/287
[51] Int. Cl. ............................................ B65g 47/24
[58] Field of Search ....... 198/33 R, 33 AH, 24, 276, 198/287; 221/158

[56] References Cited
UNITED STATES PATENTS
| 927,168 | 7/1909 | Robb | 198/33 AA |
| 2,031,949 | 2/1936 | Hartman | 198/33 R |
| 3,113,574 | 12/1963 | Greedy et al. | 198/33 AA X |

Primary Examiner—Evon C. Blunk
Assistant Examiner—Douglas D. Watts
Attorney, Agent, or Firm—Denny & Patane

[57] ABSTRACT

A machine for orienting randomly stored containers of elongated shape having a closed end and an open end including a conveyor for lifting the containers from a storage bin to the entrance end of an inclined chute. The containers are gravity fed to the delivery end of the chute along a plurality of channels. Near the entrance end of the chute is located a counter-rotating clearing drum which aids in aligning the containers in end-to-end relationship. Spaced from the drum are escapement gates, one for each channel, which serve to release in unison, at preselected intervals, a group of containers equal in number to the number of channels. The containers leaving the gates strike orienting pins mounted on rotatable arms. If a container having its open end forward reached a pin, it enters onto the pin and when the associated arm is subsequently rotated, the container is pivoted 180° and arranged with its closed end forward. If the container already has its closed end forward, it continues sliding forward toward the discharge end. The containers are then arranged on a platform in front of reciprocating members, one for each channel. The reciprocating members are activated to push groups of containers from the platform into continuously moving discharge rotating pockets. The reciprocating members are operated simultaneously once during the time it takes for the number of discharge pockets equal to the number of channels to pass in front of the platform on which the containers are oriented.

17 Claims, 19 Drawing Figures

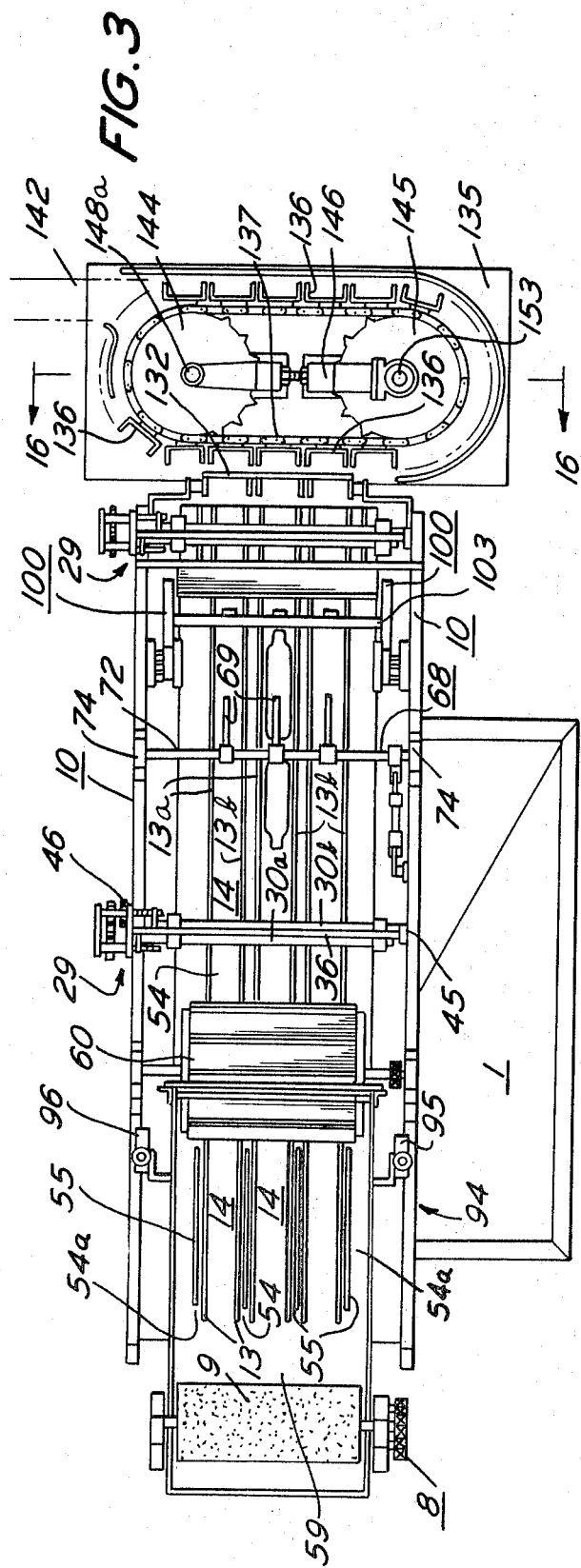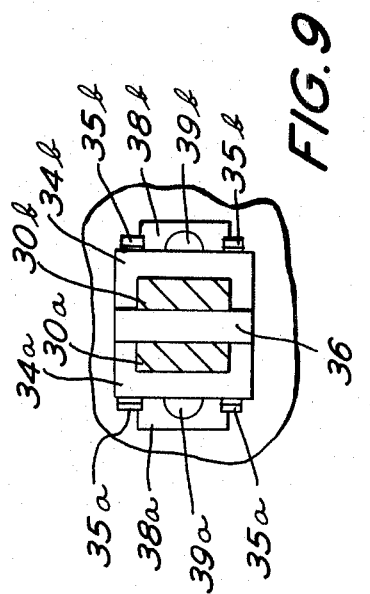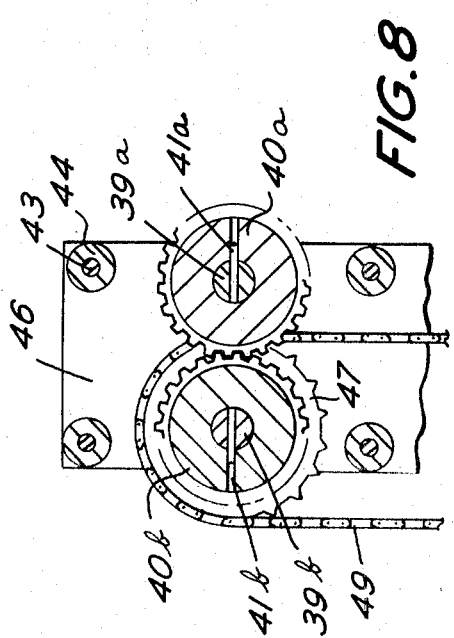

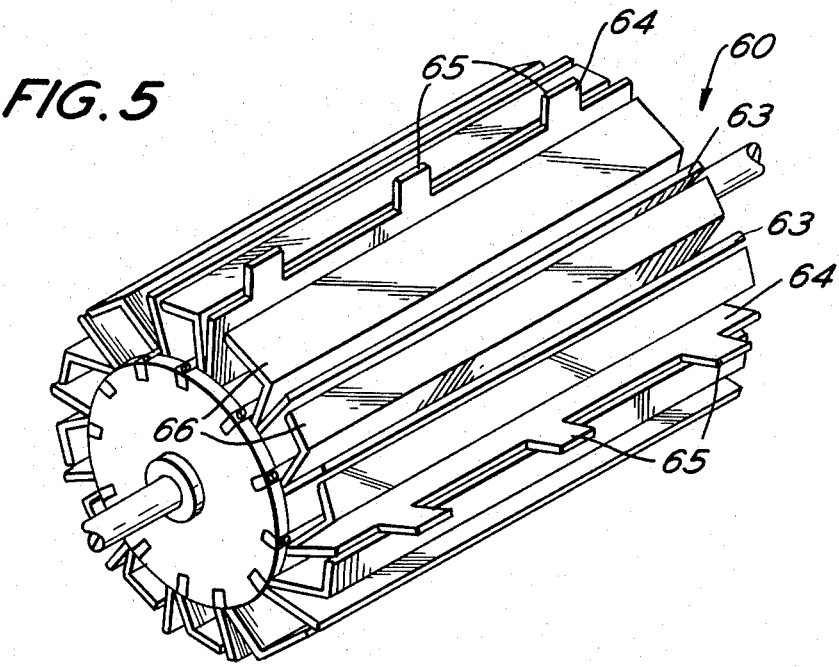
FIG. 5
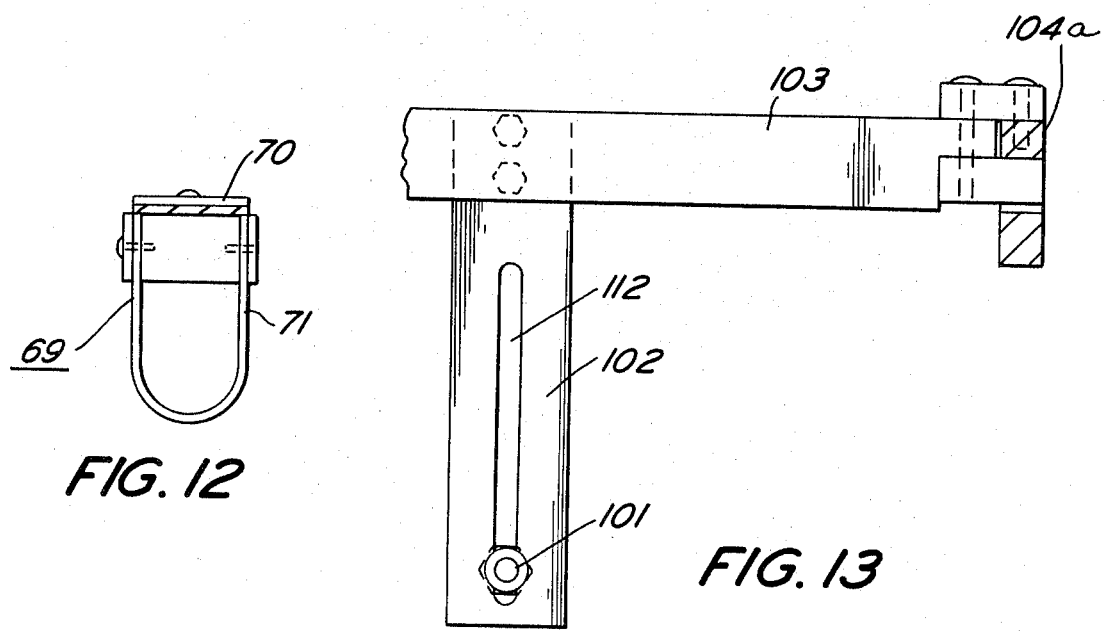
FIG. 12
FIG. 13

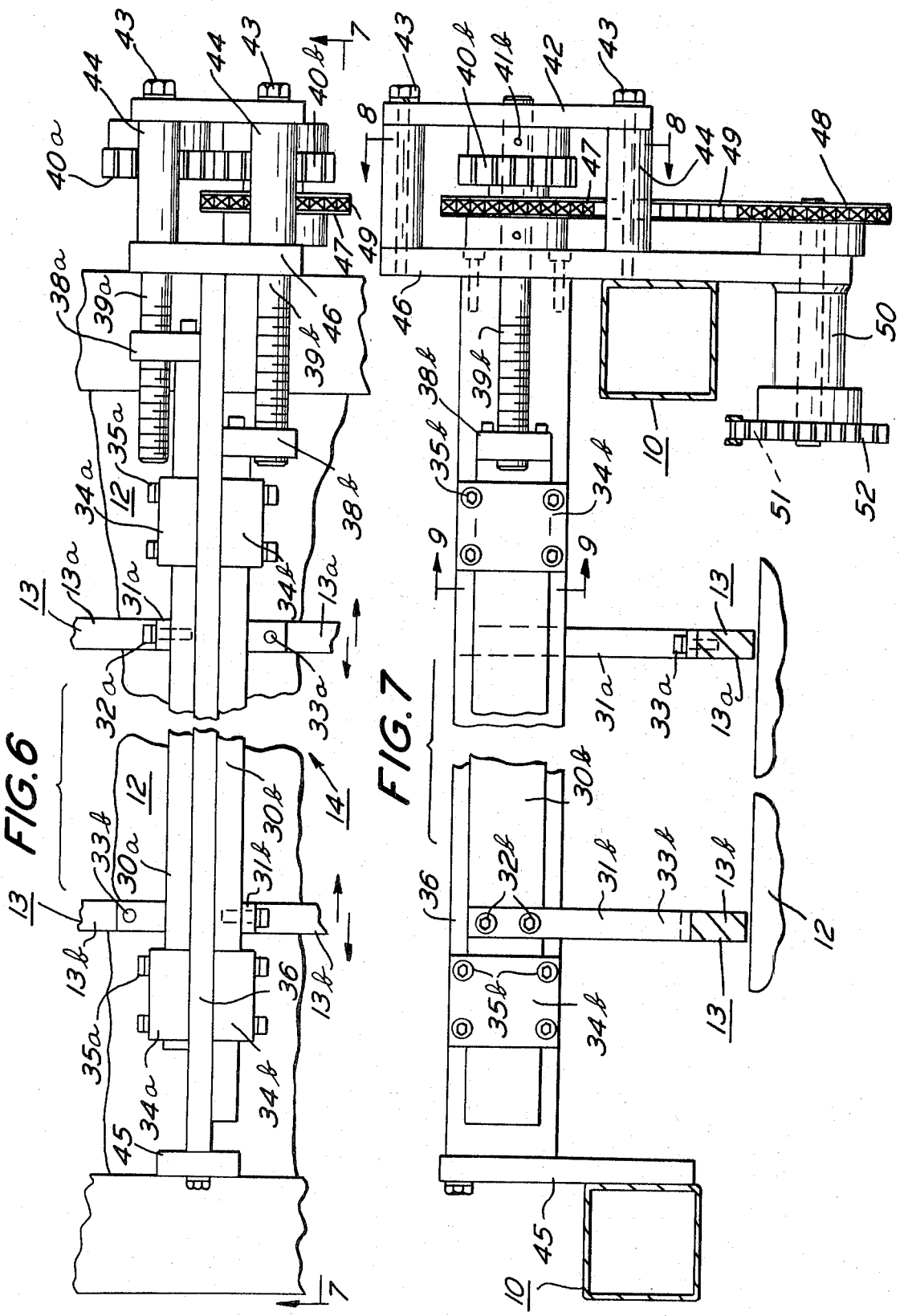

3,868,012

CONTAINER ORIENTING APPARATUS

BACKGROUND OF THE INVENTION

This invention relates to an apparatus for transporting a plurality of containers arranged in a random fashion in a storage bin to a discharge area wherein the containers are arranged in a uniform fashion. Machines for performing this general function are well known in the art but suffer from several disadvantages. Some are not capable of processing the containers to be oriented at a high enough rate to be acceptable for a variety of environments. In addition, many machines of the prior art have been too complicated in construction and massive in size to become pratical for general use. Furthermore, known machines have been ill adapted to adjust to handling a great variety of differently shaped containers thus seriously hampering their general acceptance.

SUMMARY AND OBJECTS OF THE INVENTION

It is therefore an object of the invention to provide an apparatus for orienting randomly arranged containers which is readily adaptable to accommodate various shapes of containers.

A further object is to provide a machine of the above noted character which is relatively simple in operation and dependable in performance.

A further object of the invention is to provide an apparatus which operates simultaneously on a plurality of paths of containers to thereby increase the effective speed thereof.

Briefly, the invention comprises a machine for orienting randomly stored containers of elongated shape having a closed end and an open end including a conveyor for lifting the containers from a storage bin to the entrance end of an inclined chute. The containers are gravity fed to the delivery end of the chute along a plurality of channels. Near the entrance end of the chute is located a counter-rotating clearing drum which aids in aligning the containers in end-to-end relationship. Spaced from the drum are escapement gates, one for each channel, which serve to release in unison, at preselected intervals, a group of containers equal in number to the number of channels. The containers leaving the gates strike orienting pins mounted on rotatable arms. If a container having its open end forward reaches a pin, it enters onto the pin and when the associated arm is subsequently rotated, the container is pivoted 180° and arranged with its closed end forward. If the container already has its closed end forward, it continues sliding forward toward the discharge end. The containers are then arranged on a platform in front of reciprocating members, one for each channel. The reciprocating members are activated to push groups of containers from the platform into continuously moving discharge rotating pockets. The reciprocating members are operated simultaneously once during the time it takes for the number of discharge pockets equal to the number of channels to pass in front of the platform on which the containers are oriented.

BRIEF DESCRIPTION OF THE VIEWS

FIG. 3 is a plan view of the orienting apparatus;

FIG. 5 is a perspective view of the pre-orienting drum of the apparatus;

FIG. 6 is a top view, partly broken away for clarity, of the width adjustment means for the channels;

FIG. 7 is a view taken along the lines 7—7 of FIG. 6;

FIG. 8 is a sectional view of a portion of the width adjusting means taken along the lines 8—8 of FIG. 7;

FIG. 9 is a sectional view taken along the lines 9—9 in FIG. 7;

FIG. 12 is a view taken along the lines 12—12 of FIG. 11 and showing the details of an escapement gate;

FIG. 13 is a view taken along the lines 13—13 of FIG. 11 and showing the details of the rotatable projection means;

DESCRIPTION OF THE PREFERRED EMBODIMENT

Figure 1:
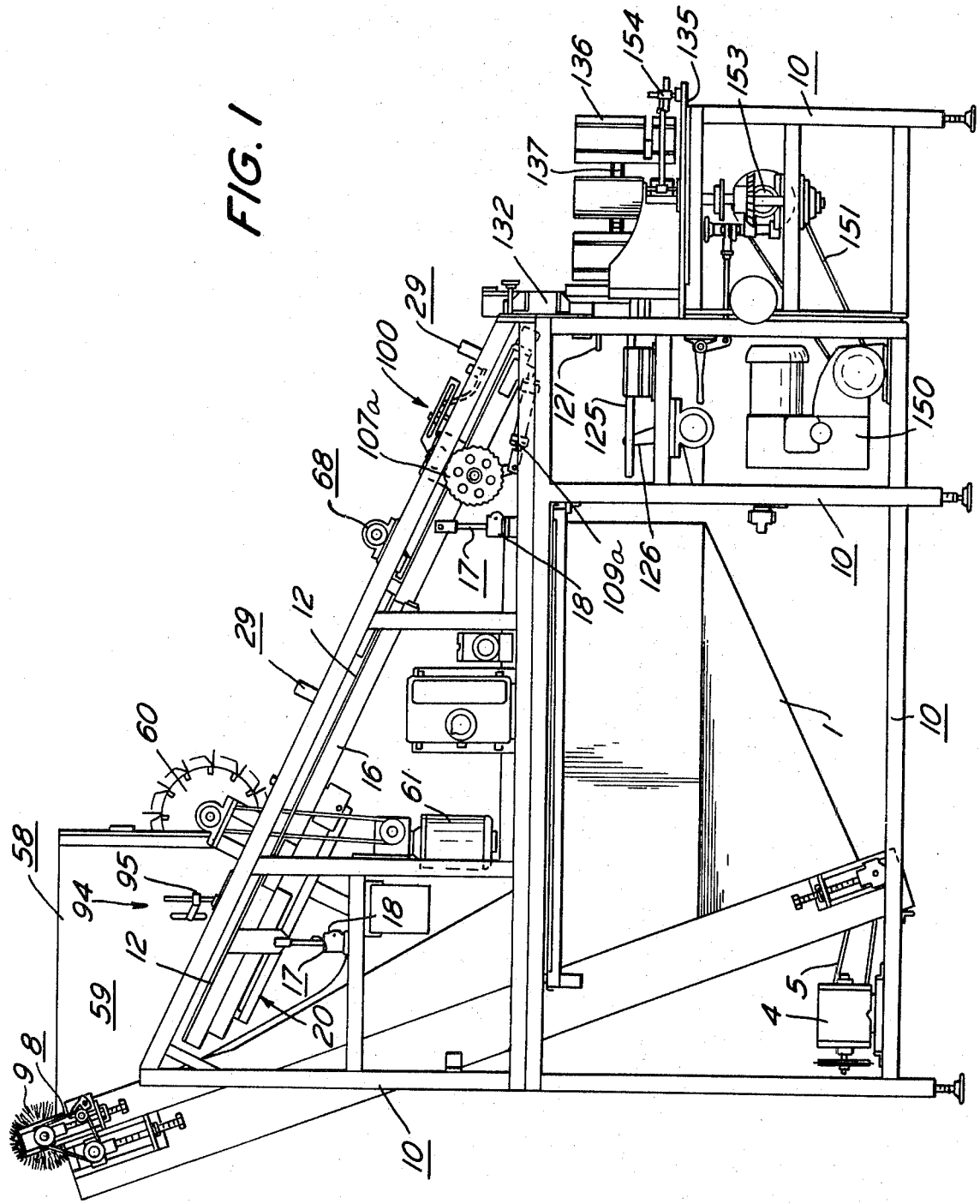
FIG. 1 is a side elevation view of the orienting apparatus of the invention.

Referring to the drawings, there is illustrated the preferred embodiment of the machine of the invention which comprises a storage bin 1 in which a plurality of containers 11 are stored in random orientation. The bottom wall of the storage bin 1 is inclined to allow the containers 11 to drift by gravity toward a lift conveyor 2 including flight bars 3 on which the containers 11 are lodged and moved upwardly toward the orienting portion of the machine. A suitable opening (not shown) in the storage bin 1 is provided through which the containers 11 are replenished. The conveyor belt 2 is driven in the direction indicated by the arrow in FIG. 4, by a motor 4 by means of a conventional belt and roller drive arrangement 5.

Figure 4:
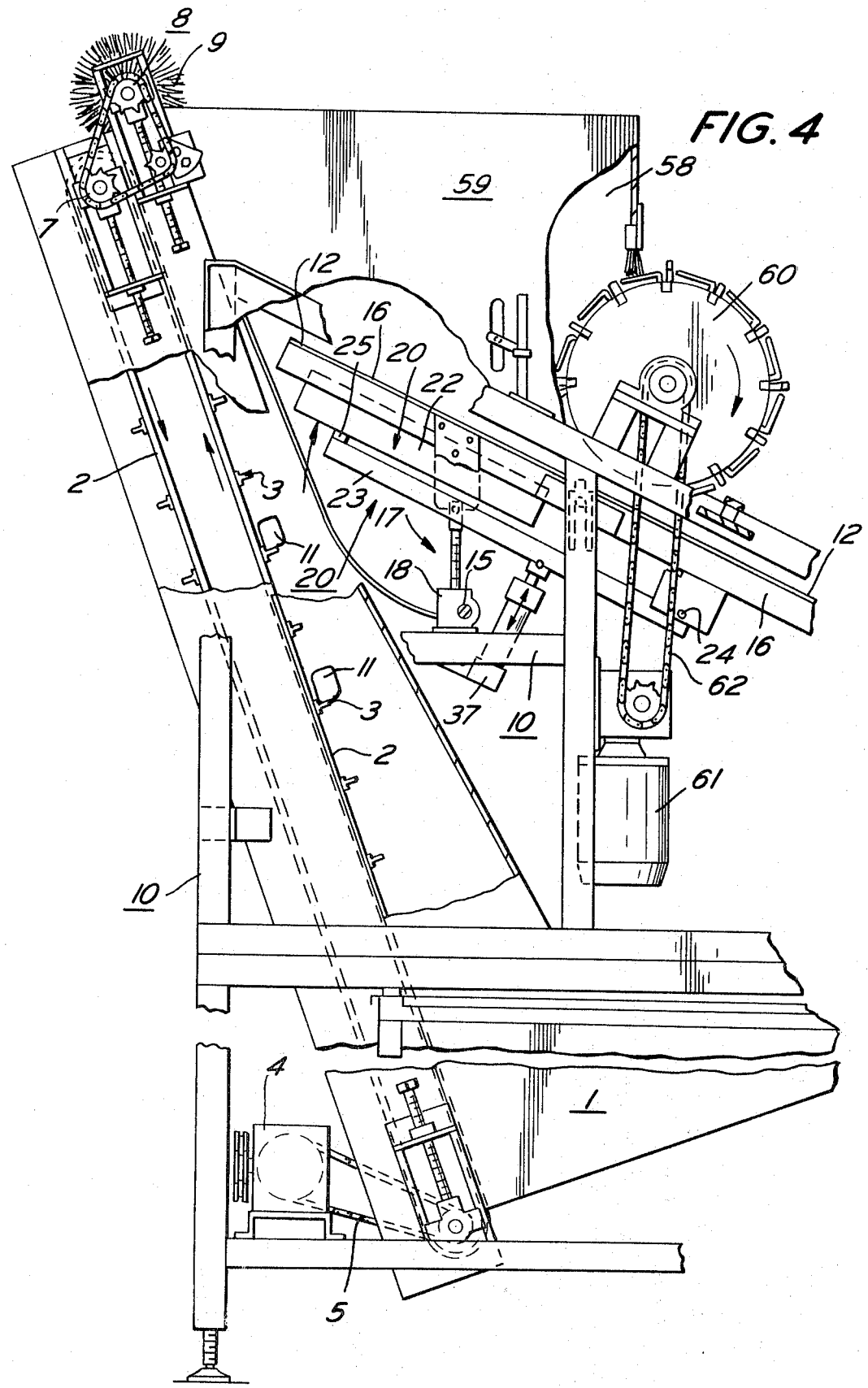
FIG. 4 is an enlarged side elevation of a portion of the orienting apparatus showing the details of the lift conveyor belt and the pre-orienting drum.

Located adjacent the top of the lift conveyor 2 is a circular brush 9 which is continuously rotated in a counterclockwise direction as seen in FIG. 4, the brush 9 being driven via a suitable chain and sprocket arrangement 8 from the moving conveyor 2. The lift conveyor 2 and the various other components of the machine, to be discussed hereinafter, are supported in a conventional fashion from main frame 10, only portins of which are shown for the sake of clarity.

The portions of the machine described thus far serve to lift the randomly oriented containers 11 from the storage bin and deliver them to the highest or entrance end of an inclined chute 12. The chute 12 comprises a thin rectangular piece of sheet metal supported at approximately a 25° angle to the horizontal by means of side rails 16 which are in turn supported from the main frame 10. The chute 12 is adjustable in height by means of the adjusting arrangement 17 including a handwheel 19, FIG. 2, for operating several pairs of jack screws 18 via a chain and sprocket arrangement 17, the jack screw pairs being spaced along the length of the chute 12 and coupled to the side rails 16. Each jack screw pair includes two jack screws located on opposite sides of the chute 12 and coupled together for movement in unison by a shaft 15, the shafts being driven from the handwheel via the linkage 17.

Mounted above the chute 12 and extending substantially its entire length are a plurality of pairs of guides or dividers 13 which form a plurality of channels 14 the dividers 13 being supported from the main frame 10 by adjustable support means 29 located at appropriate intervals along the length of the chute 12.

In order to accommodate containers of various widths, the dividers 13 are arranged into a plurality of pairs, each pair comprising the dividers 13a and 13b which are mounted for adjustable movement relative to one another widthwise of the machine. To this end, as best illustrated in FIGS. 3 and 6–9, the dividers 13a are supported from a cross slide 30a by means of an L-shaped arm 31a, the fasteners 32a connecting the arm to the cross slide and the fastener 33a connecting the dividers 13a to the arm.

The cross slide 30a is mounted for reciprocal sliding motion in spaced U-shaped bearings 34a, the bearings being coupled by means of fasteners 35a to a cross bar support 36. The cross bar support 36 spans the width of the chute 12 and is carried by support pedestals 45 and 46 located on opposite sides of chute 12. The pedestals 45 and 46 are in turn supported from the main frame 10.

The cross slide 30a also has a threaded projection 38a coupled thereto by means of suitable fasteners, the projection 38a having an internally threaded opening in which is engaged the threaded portion of a shaft 39a, the shaft 39a also being journalled at its unthreaded portion in the pedestal 46 and in a support plate 42, as best shown in FIG. 7. The support plate 42 is rigidly fixed in spaced relationship to the pedestal 46 by means of bolts 43 and spacers 44. The shaft 39a is also coupled to a spur gear 40a by means of a radially disposed pin 41a. As can be seen, rotation of the spur gear 40a results in rotation of the shaft 39a and movement of the slide 30a in the bearings 34a due to the threaded engagement of the threaded portion of the shaft 39a with the projection 38a.

As shown in FIGS. 6 and 7, the dividers 13b are supported in a manner similar to that discussed above with respect to the dividers 13a. Briefly, the dividers 13b are mounted on a cross slide 30b by means of an arm 31b, the fasteners 32b and 33b being used to couple the arm 31b to the slide 30b and dividers, respectively. The slide 30b is also mounted for widthwise motion in the bearings 34b, the bearings being coupled to the support bar 36 by the fasteners 35b.

The cross slide 30b has coupled thereto a projection 38b having a threaded opening which engages with the threaded portion of a shaft 39b, the shaft 39b being spaced from and parallel to the shaft 39a. The shaft 39b is coupled by means of a pin 41b to a spur gear 40b which is meshed with the gear 40a and journalled in openings in the pedestal 46 and the support plate 42.

The shaft 39b has coupled thereto a sprocket wheel 47 which in turn is coupled to a sprocket wheel 48 by means of a chain 49. The sprocket wheel 48 is mounted on one end of a shaft 50 carried in the pedestal 46, the other end of the shaft 50 having mounted thereto another sprocket wheel 51 driven by a chain 52 which links the various adjustment units 29 to each other, FIG. 2. The chain 52 may be driven by a suitably located handwheel 53 to adjust the width of the channels.

In operation, as the handwheel 53 is turned, its motion is transferred by the intermediate linkages to the spur gears 40a and 40b which results in opposed dividers 13a and 13b of each pair moving either toward or away from each other, depending on the direction in which the handwheel 53 is rotated.

Figure 17:
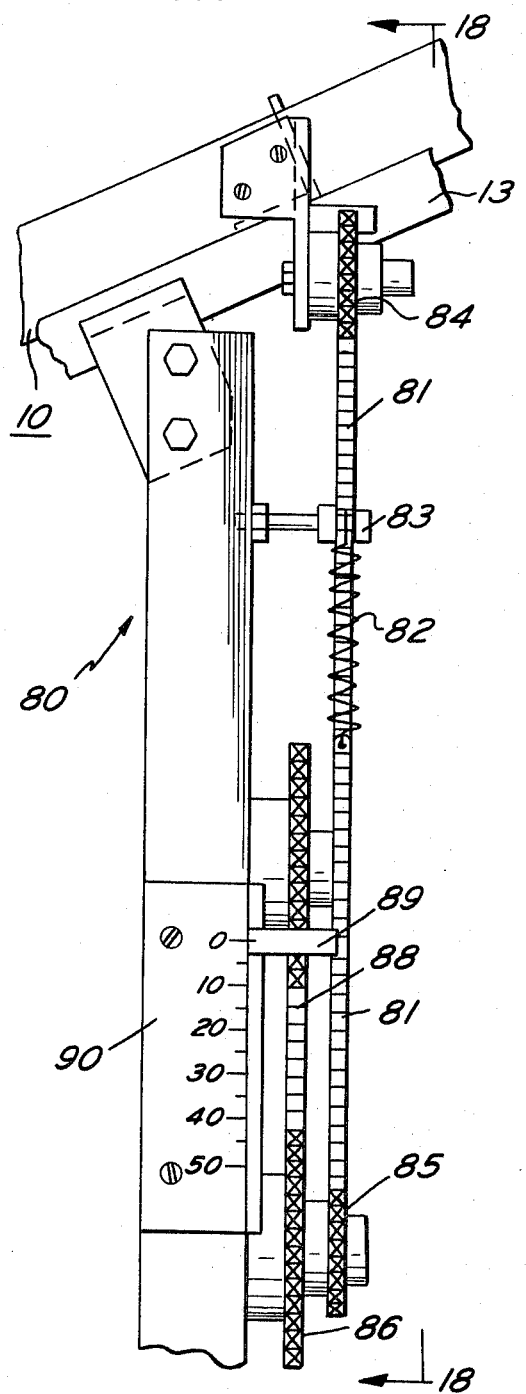
FIG. 17 is an elevation view of an adjusting arrangement for changing the width of the channels.
Figure 18:
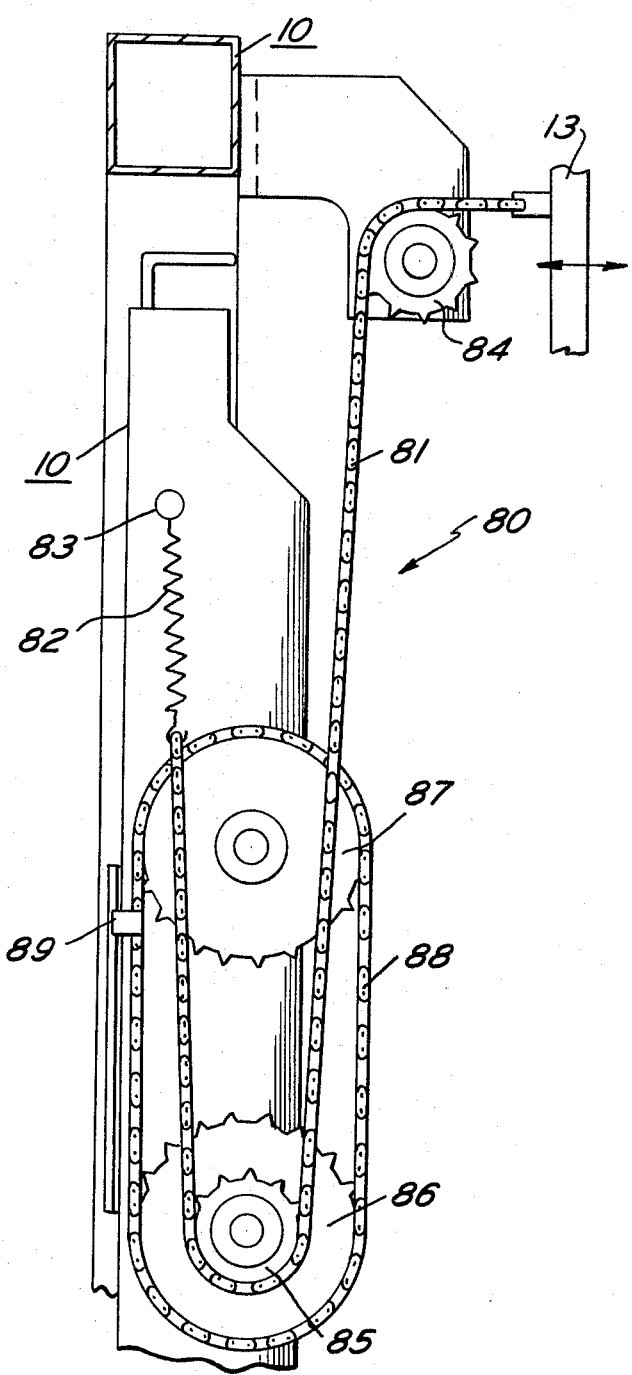
FIG. 18 is a view taken along the lines 18—18 of FIG. 17.

As a means of providing an indication of the width of the channels 14 at any given moment, there is provided, as best seen in FIGS. 17 and 18, a channel width indicating arrangement 80 which comprises a first chain 81 attached at one end to a divider 13 and attached at its other end to one end of a spring 82, the other end of the spring being connected to the main frame 10 by means of a pin 83. Intermediate its ends, the chain 81 engages sprocket wheels 84 and 85, both of which are mounted on shafts journalled in the main frame 10. The sprocket wheel 84 merely changes the direction of the force applied by the divider 13 to the chain 81. The shaft on which the sprocket wheel 85 is mounted also has coupled thereto a second sprocket wheel 86, the sprocket wheel 86 being connected to a sprocket wheel 87 by means of a chain 88. The chain 88 has attached thereto a pointer 89 which is movable along an indicating scale 90, the scale 90 being mounted in a fixed position from the frame 10.

In operation, as the width of the channels 14 is changed by means of the above discussed adjustment arrangements 29, the dividers 13 are moved. Movement of one of the dividers 13 is transformed via the chain 81, sprocket wheels 84, 85, 86 and 87 and chain 88 into movement of the pointer 89 along the indicating scale 90. Thus, by mounting the channel width indicating arrangement 80 adjacent the handwheel 53 which controls the width adjusting units 29 for the channels 14, it is possible to calibrate the scale so that the channel width at any given moment may be read directly from the indicator scale 90.

The containers 11 are thrust by the brush 9 into an accumulation area 59 which is defined by a housing 58 and into which the top portions of the dividers 13 extend. Since the width of each channel 14 has been preadjusted to correspond to the width of the containers 11, some of the containers 11 fall at random into the channels 14.

Ideally, the containers 11 in the accumulation area fall into the channels 14 with their long axis parallel to the dividers with their widthwise dimension in contact with the top surface of the chute 12. However, in the normal situation, the containers enter the channels in various different skewed orientations and means must be provided to insure that the containers 11 proceed through the machine with each container lying flat with its long axis parallel to the dividers and its widthwise dimension fully occupying the width of the channel.

The unused channels 54 between adjacent channels 14 vary in size dependent upon the width of the containers being processed. In order to prevent containers from lodging in these channels in the accumulation area 59, wooden or paper filler members 55 are inserted in these spaces 54. Similar members 55 are also inserted in the areas 54a alongside the outermost channels 14, as shown in FIG. 3.

In order to insure proper orientation of the containers in the channels 14, there is provided immediately below the accumulation area 59 a pre-orienting drum 60 which is located above the dividers 13 and spans the width of the chute 12 toward which the containers drift by gravity. The drum 60 is mounted on a shaft carried by upright support members mounted to the main frame 10 and is continuously rotated counter to the direction of movement of the containers through the machine by a motor 61 via a conventional chain and sprocket arrangement 62. Referring to FIG. 5, the drum 60 is seen to include radially projecting baffles of two types. The first type baffle 63 has its most extended portions arranged to sweep even with or slightly above the tops of the dividers 13. The second type of baffle 64 includes rectangular projecting portions 65 which sweep through the channels 14 counter to the direction of movement of the containers at a depth which is insufficient to disturb properly oriented containers 11 but which thrusts stacked or skewed containers backwardly into the accumulation area 59. The baffles 63 and 64 also tend to agitate the mass of containers in the accumulation area, thereby encouraging movement into the channels 14. The spaces between the baffles 63 and 64 and the drum 60 are filled by L-shaped members 66 of sheet metal. The baffles 63 and 64 may be made of any suitable plastic material which provides adequate stiffness to accomplish their intended function.

Figure 2:
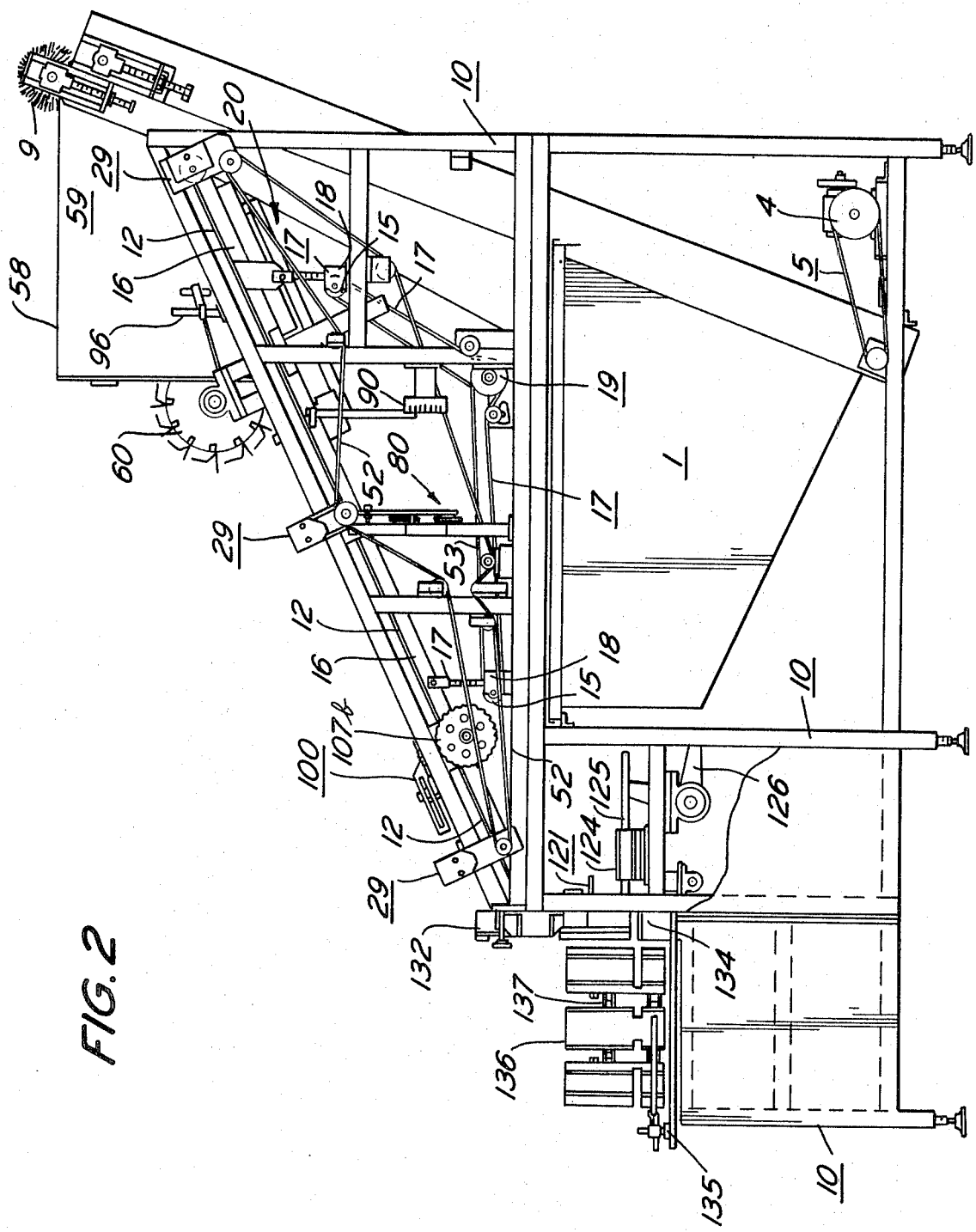
FIG. 2 is a side elevation view of the orienting apparatus taken from the side opposite to that shown in FIG. 1.

A conventional photoelectric sensing unit 94, FIG. 1–3, comprising a light transmitter 95 and receiver 96 is arranged adjacent the drum 60 to detect an unusual back up of containers in the area adjacent the drum. Upon such an occurrence, the light beam is broken resulting in a control signal which stops the motor 4 thereby halting the feed of containers to the orienting portion of the machine.

With the machine in operation, containers 11 arranged in end-to-end relationship, stream past the drum 60 toward the discharge end of the chute 12. Referring to FIG. 3, an escapement control means 68 is provided to stop this flow of containers until a preselected time at which a group of containers corresponding to the number of channels is released and immediately thereafter stopping the flow again.

Figure 10:
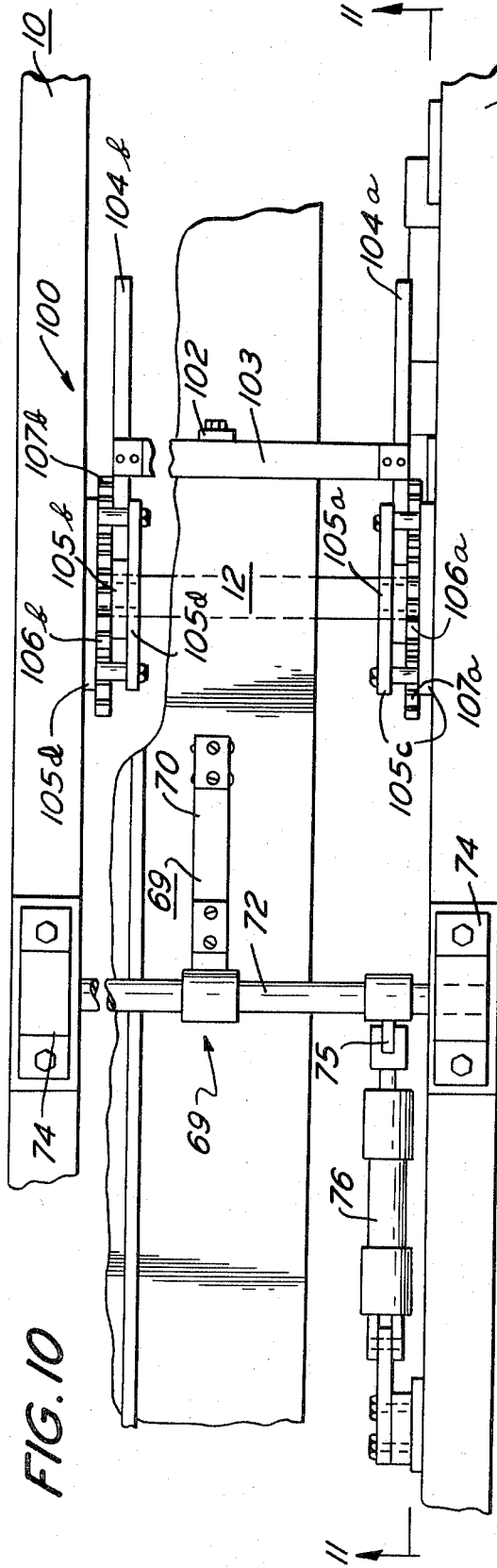
FIG. 10 is an elevation view of a portion of the escapement control means and the rotatable projection means for orienting the containers with closed ends forward.
Figure 11:
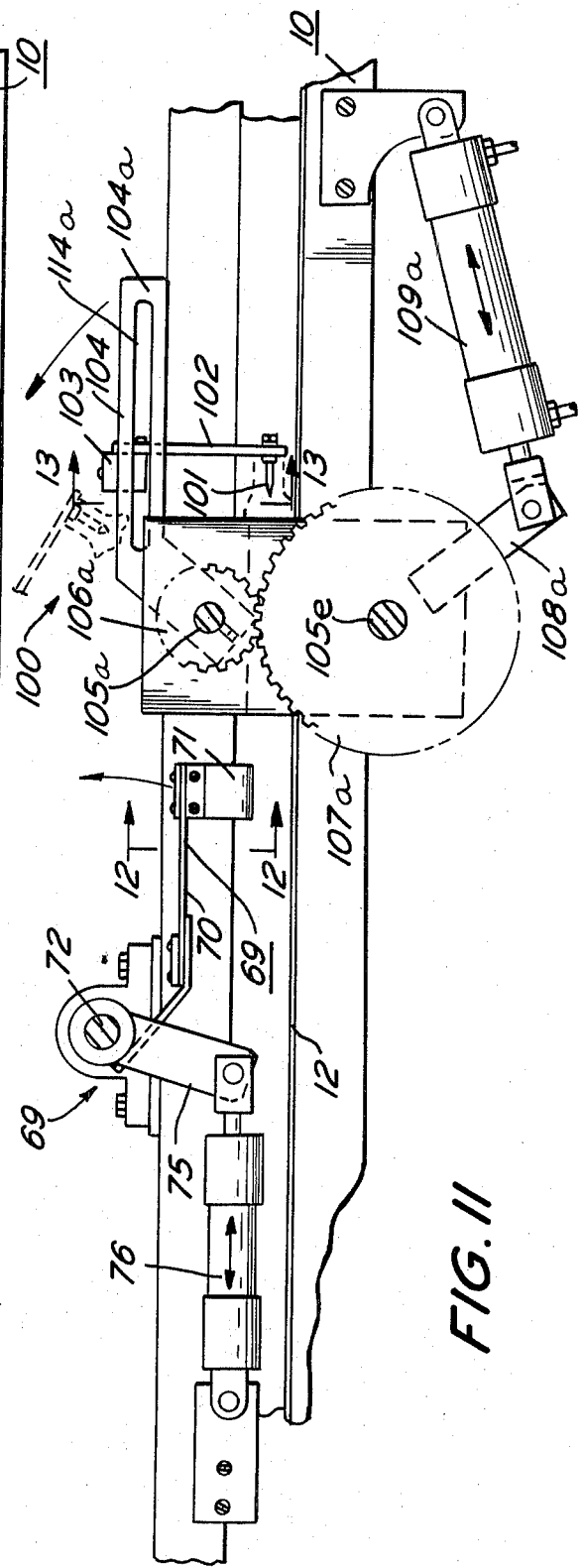
FIG. 11 is a sectional view taken along the lines 11—11 of FIG. 10.

The escapement control means 68 comprises escapement gates 69 for each of the channels 14. Referring to FIGS. 10–12, each escapement gate 69 comprises an arm 70 having attached to one end thereof a U-shaped semi-flexible stop member 71 made of a suitably stiff rubber or plastic material. The other end of the arm 70 is attached to a shaft 72 which spans the width of the chute 12 and is supported at its ends in opening in uprights 74 mounted on the main frame 10. The shaft 72 is rotated by means of a crank arm 75 which is driven by the piston of a pneumatic cylinder 76 also attached to the main frame 10.

In operation, when the gates 69 are rotated to their downwardmost position, the stop members 71 abut the tops of the containers 11 so as to prevent them from moving forward. When the gates are rotated upwardly, a group of containers 11 (in the embodiment shown, the group would comprise three containers) is released to slide forward toward the discharge end of the chute 12. As soon as this group has cleared the gate 69, it is again rotated to its downwardmost position to hold the next group of three containers until the proper time for release. Thus, the escapement control means 68 of the illustrated embodiment of the invention functions to periodically release groups of three containers each at preselected intervals. A more detailed explanation of the timing for the escapement gates 69 will be given below.

The containers 11 moving past the escapement control means 68 engage a closed-end-forward orienting mechanism 100, seen best in FIG. 10, 11, 11a and 13. The orienting mechanism 100 comprises a plurality of elongated projections 101 located in each channel at a depth corresponding to the opening in one end of a properly oriented container lying in the channel 14. The projections 101 are mounted on arms 102 attached to a cross-bar 103 which spans the width of the chute 12. The projections 101 are adjustable in height by sliding movement in a slot 112, FIG. 13, formed in the arm 102.

Referring to FIGS. 10 and 11, the bar 103 is fixed at its ends to arms 104a and 104b and positionable along the length of these arms by sliding movement in slots 114a one of which is shown in FIG. 11. The arm 104b has a slot similar to the slot 114a in the arm 104b, but the slot in arm 104b is not shown in FIG. 11, as it is behind the arm 104a. The arms 104a and 104b are in turn coupled to shafts 105a and 105b, the latter being mounted in spaced flanges 105c and 105d, respectively, carried by the main frame 10. The shafts 105a and 105b have attached thereto gears 106a and 106b, respectively, FIG. 10, these gears 106a and 106b meshing with a second pair of gears 107a and 107b, respectively. The two gears 107a and 107b are connected to each other by a shaft 105e which is journalled in spaced flanges 105c and 105d, the flanges 105c and 105d being supported by the frame 10. The gear 107a is driven by a crank arm 108a (FIG. 10) attached thereto, the crank arm 108a being pivotally coupled at one end thereof to pneumatic cylinder 109a. Thus, the crank arm 108a drives gear 107a and gear 108a through shaft 105e.

In operation, as the containers 11 move down the chute 12 they engage the projections 101. If a container has its open end forward, it enters onto the projection 101 and when the projection is rotated upwardly, FIG. 11a, by operation of the pneumatic cylinder 109a, the container 11 is rotated approximately 120° at which point it slides downwardly off the projection 101 by gravity and descends to the surface of the chute with its closed end forward.

If, on the otherhand, the container 11 arrives at the projection 101 with its closed end forward, upon rotation of the projection 101, the container slides forward by gravity underneath and past the projection 101 toward the discharge end of the chute 12. Thus, in this manner, all the containers are fed to the discharge end of the machine with their closed ends forward.

Figure 14:
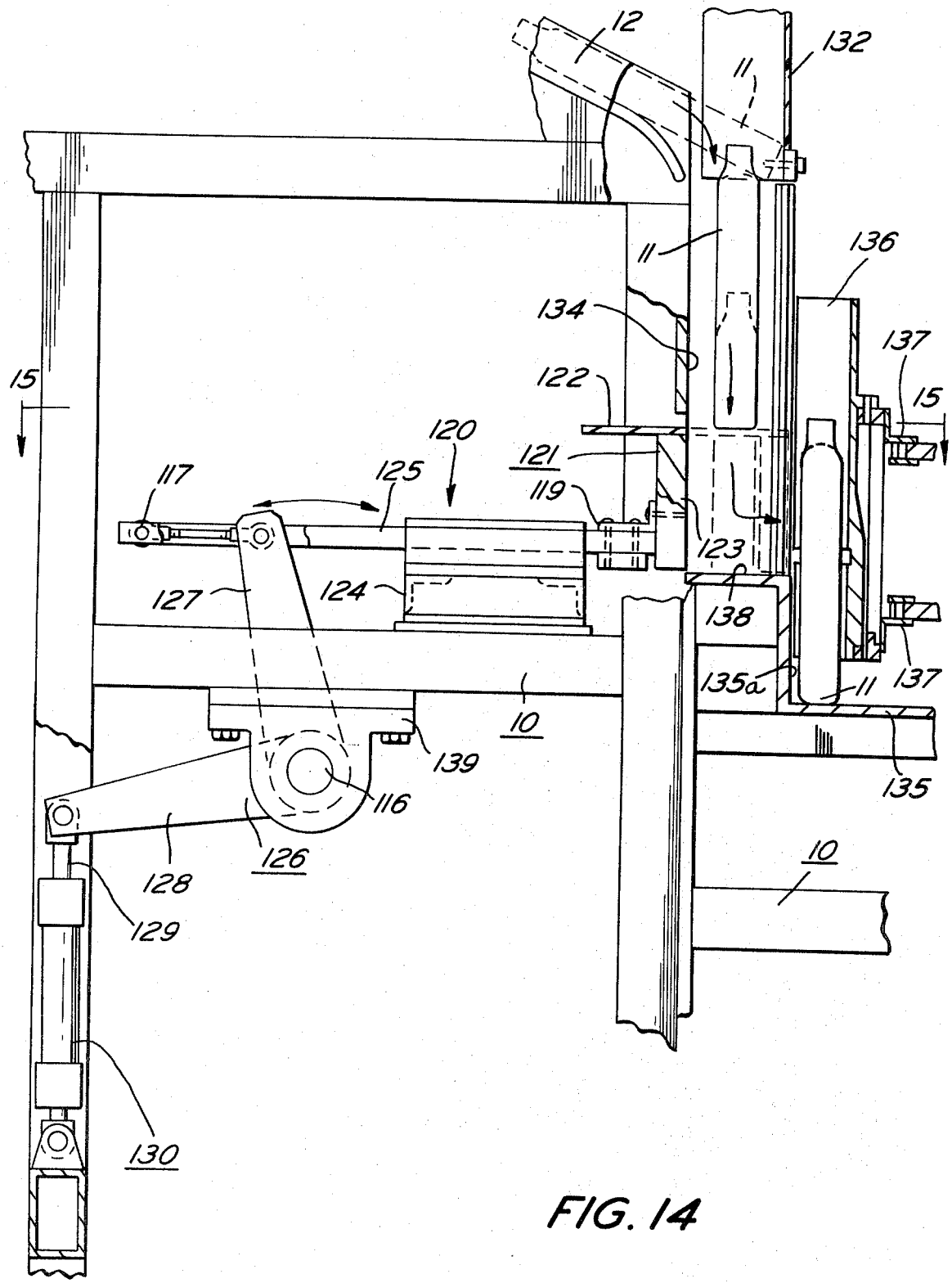
FIG. 14 is an enlarged elevation view of the reciprocating feed means and the drive means therefore, and illustrating the movement of the containers into the continuously moving collection pockets.

After moving past the closed-end-forward orienting means 100 the containers 11 slide off the end of the chute 12, FIG. 14, and are guided by various wall means 132 and 134 for deposition in an upright position on the upper horizontal walls 122 of a plurality of reciprocating plungers 121.

In the disclosed embodiment, three plungers 121 are provided, one for each of the channels 14. The plungers 121 include the aforementioned upper horizontal walls 122 on which the containers 11 are initially deposited in an upright position and forward walls 123 for subsequently pushing the containers 11 in the continuously moving collection pockets 136, as will be described in more detail below.

The plungers 121, FIG. 14, are reciprocated in unison with each other by means of push rods 125, the push rods 125 being attached in conventional fashion to the rear walls 123 of the outermost plungers 121. The plungers 121 are connected to each other by means of cross pieces 136a, FIG. 15, so that motion delivered to the outside plungers is likewise transferred to the middle plunger 121. The rods 125 ride in bearings 124, the bearings 124 being supported by cross girts 118 which span the width of the machine and are supported at their ends from the main frame 10. As shown n FIG. 15, the rods 125 are coupled to the arms 127 of a bell crank 126 via suitable pivotable connecting links 140 in a conventional manner.

Figure 15:
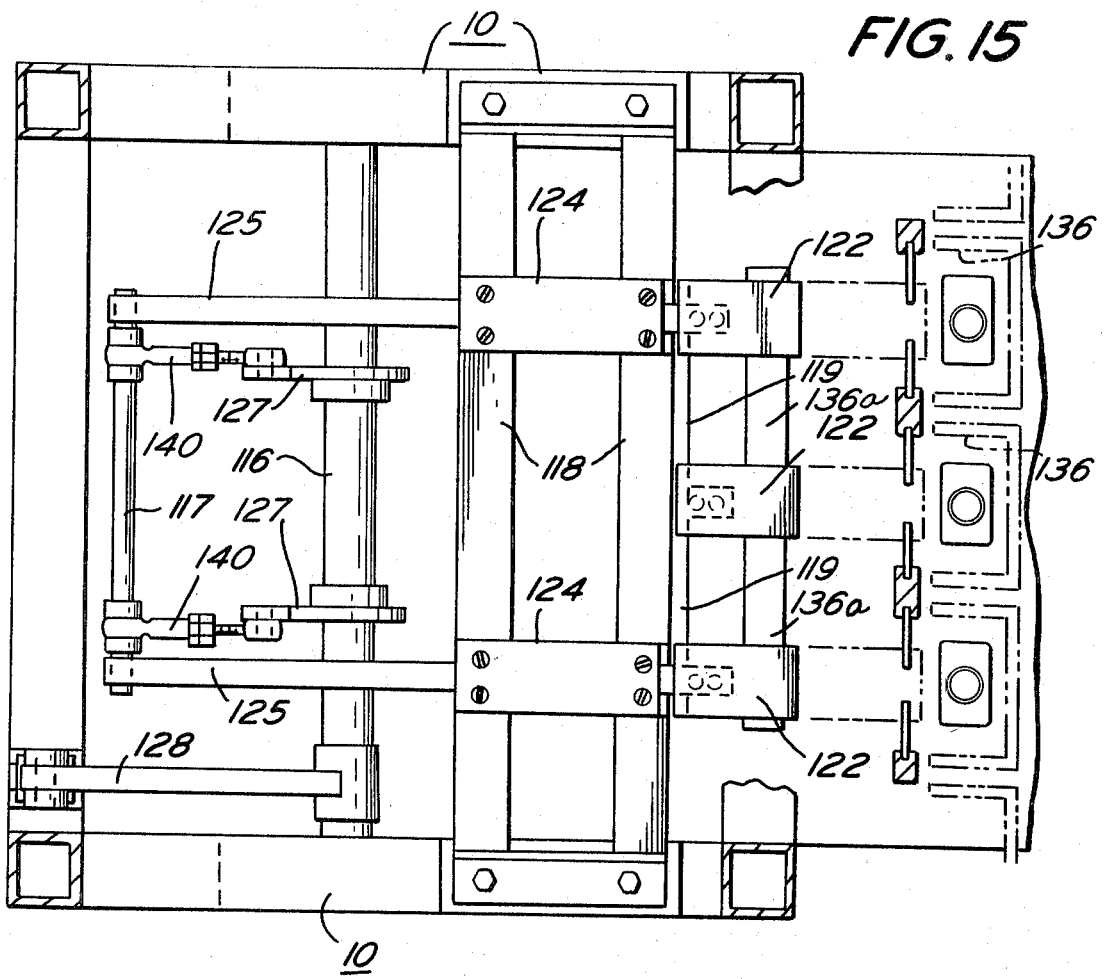
FIG. 15 is a view taken along the lines 15—15 of FIG. 14.
Figure 11A:
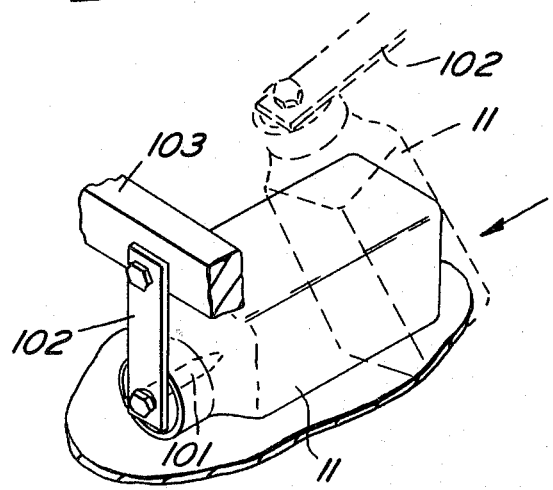
FIG. 11a is a perspective illustrating the operation of one of the rotatable projections for orienting the closed ends of the containers forwardly.

The bell crank 126, as shown in FIGS. 1, 14 and 15, being pivoted on a shaft 116 which is journalled in support members mounted on the main frame 10 and spans the width of the machine. The bell crank 126 also includes a lower arm 128, FIG. 14, which is pivotally attached to a rod 129 coupled to a pneumatic cylinder 130, as shown in FIG. 14. Thus, motion of the piston of the pneumatic cylinder 130 is delivered via the lower bell crank arm 128 to the upper arms 127 and to the rods 125, FIG. 15, which reciprocate in the bearings 124 resulting in back and forth motion of the plungers 121.

Assuming that a container has been deposited from each of the channels 14 onto the upper walls 122 of each of the plungers 121, FIG. 14, when the plungers 121 are moved rearwardly beyond the surface 134 the containers 11 are wiped from the top surface of the walls 122 by abutment with the walls 134 and fall by gravity to a collection platform 138, as shown in phantom in FIG. 14. Upon subsequent forward motion of the plungers 121, the containers 11 are engaged and pushed by the forward walls 123 and thrust forwardly into moving collection pockets 136. The containers 11 concurrently drop to a lower level of a discharge table 135 above which the pockets 136 move for subsequent delivery to a discharge conveyor (not shown) and are prevented from moving backwardly by vertical face 135a. Thus, it is seen that the vertical face 135a also serves to trap the containers in the pockets 136, as the pockets 136 move past the face 135a.

Figure 16:
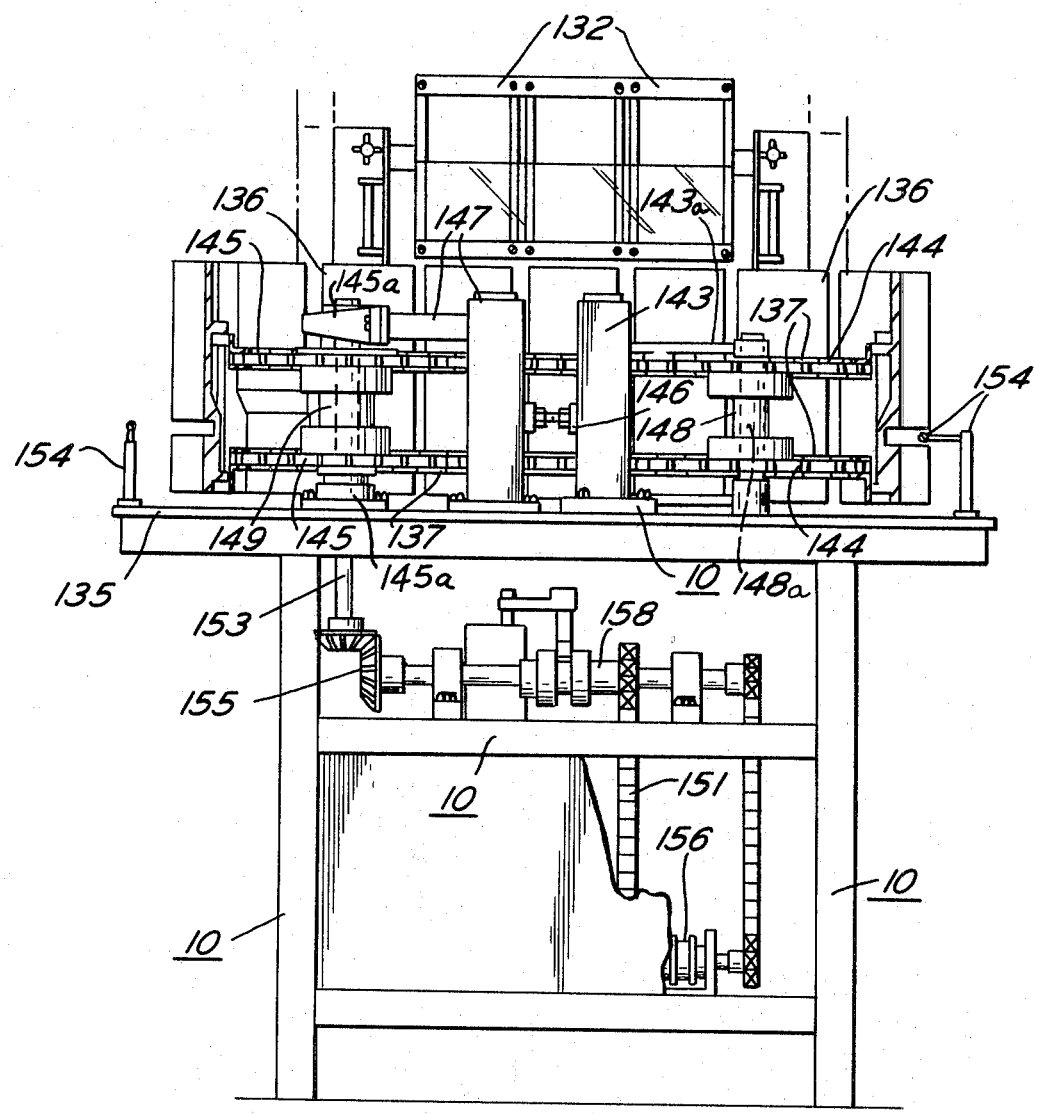
FIG. 16 is a sectional view taken along the lines 16—16 in FIG. 3 and showing the details of the container collection and discharge means and the drive means therefore.

As shown in FIG. 16, the collection pockets 136 are attached to upper and lower collection chains 137 which engage the sprocket wheels 144 and 145. The sprocket wheels 145 (on the left side of FIG. 16) are mounted on a sleeve 149. The spacer sleeve 149 is fastened to the shaft 153 and the sprocket wheels 145 are driven by shaft 153. On opposite sides of the sprocket wheel 145 are placed bearings 145a carried by the frame 10 by mounting members 147.

The spacer sleeve 148 is fastened to a shaft 148a and the sprocket wheels 144 are idlers for the two chains 137. Mounting member 143 is slidable attached to the frame 10 and arms 143a extend therefrom and carry bearings which support the ends of shaft 148a so that the shaft 148a may be moved back and forth for chain tightening or adjustment. The sprocket wheels 144 (on the right side of FIG. 16) are likewise coupled to a spacer sleeve 148 and supported by members 143 from the main frame 10. The sprocket wheels 145 are rotated continuously by motor 150, FIG. 1, via a chain 151 and conventional transmission shaft means 158, FIG. 16, this motion being transmitted to bevel gears 155 (FIG. 16) and through shaft 153 to sprocket the chains 137, sprocket wheels 144 and pockets 136.

As shown in FIG. 3, the collection pockets 136 are U-shaped, with the open side of the U facing the plungers 121, as shown in FIG. 14, to receive the containers 11. The collection pockets 136 move above a discharge table 135, FIGS. 14 and 16, on which the discharged containers are slidably moved by the pockets 136. Guide rails 154, FIG. 16, are provided to hold the discharged containers 11 within the pockets 136 prior to delivery to a feed conveyor (not shown).

The operation of the various above mentioned pneumatic cylinders is controlled by means of a series of cams 156 which operate valves (not shown) controlling the air supply to the various pneumatic cylinders discussed above. The movement of the cams 156, by virtue of their being driven by the chain 151, is related to the speed of movement of the pockets 136 in front of the discharge platform 138. One cycle of the machine is defined as the time needed for a plurality of pockets equal to the number of channels 14 (three in the case of the illustrated embodiment) to pass in front of a fixed point on the discharge platform 138.

Assuming a cycle has just been completed, i.e., three containers 11 have been pushed into associated collection pockets 136, the next cycle begins by the operation of the pneumatic cylinder 76 controlling the escapement gates 69, FIG. 10. This raises the gates 69 to allow a group of containers equal to the number of channels 14 to move into engagement with the projections 101. The gates 69 are then immediately lowered to hold the next group of containers 11 from proceeding forward.

At a point in the cycle after the above noted released group of containers reaches the projections 101, the pneumatic cylinder 109a, FIG. 11, is operated to rotate the projections 101 in a counterclockwise direction, as discussed above. The projections are then rotated clockwise to return them into a position traverse of the channels 14.

After the operation of the cylinder 109a, and at or just before the end of the cycle, at which time three unfilled pockets are to be located in front of the plungers 121, the plunger operating cylinder 130 is operated, which results in the rearward and then forward motion of the plungers 121 to thereby push the group of containers 11 into the unfilled pockets 136.

In order to prevent jams, there may be provided in the accumulation area 59 a jam release means 20, FIGS. 1, 2 and 4, including jam release bars 22 coupled together by means of a cross bar 25, the cross bar 25 being attached to one end of a lever 23. The other end of the lever 23 is pivotally supported from the main frame 10 on a pivot pin 24. A pneumatic cylinder 37 is connected to the mid-portion of the lever 23 to move it up and down. Elongated slots are cut into the bottom of the channels 14 through which the release bars 22 project such that as the lever 23 is reciprocated by the means of the pneumatic cylinder 37 the jam release bars 22 move upwardly into the channels 14 in accumulation area to agitate the containers and thereby prevent the formation of jams.

The invention may be embodied in other specific forms without departing from the spirit or essential characteristics thereof. The embodiment described hereinbefore is therefore to be considered in all respects as illustrative and not restrictive, the scope of the invention being indicated by the appended claims rather than by the foregoing description.

Having described my invention, what I claim is:

1. A machine for arranging randomly oriented containers of elongated shape having an open end and closed end comprising, a storage bin for holding a plurality of said containers in random orientation, an inclined chute having an entrance end and a discharge end, dividers located above said chute for defining a plurality of channels, conveyor means for transporting containers from said bin to the entrance end of said chute, said containers falling into said channels and moving by gravity from said entrance end toward said discharge end, drum means rotatable in a direction counter to the direction of movement of said containers along said chute for permitting said containers to pass only when arranged in end-to-end relationship in said channels with either their closed ends or open ends forward, escapement means for releasing groups of said containers equal to the number of said channels at preselected intervals, closed-end-forward orienting means for operating on said groups to insure forward movement of each container down the chute only with its closed end forward, reciprocating means located adjacent said discharge end of said chute for pushing each group of containers forwardly in unison at preselected intervals, collection means including U-shaped receiving pockets and means for continuously moving said pockets in front of said reciprocating means with the open ends of said U-shaped pockets facing said reciprocating means, and means for timing the operation of said escapement means, said closed-end-forward orienting means and said reciprocating means in order to push each group of said containers in unison into unfilled pockets on said collection means.

2. The combination recited in claim 1 wherein said drum includes radially disposed baffles for displacing misaligned containers.

3. The combination recited in claim 1 further including adjustment means for moving said dividers widthwise of said chute for varying the width of said channels.

4. The combination recited in claim 1 wherein said escapement means comprises gates, each gate including a seim-flexible U-shaped holding member, and means for rotating said member into and out of engagement with said containers.

5. The combination recited in claim 4 wherein said means for rotating includes pneumatic cylinder means.

6. The combination recited in claim 1 wherein said closed-end-forward orienting means includes elongated projections mounted in the path of movement of said containers and positioned to enter the open ends of containers having their open ends forward, and means for rotating said projections at preselected intervals, whereby containers with their closed ends forward continue sliding down the chute upon rotation of said projections, and containers having their open ends forward are concurrently lifted and rotated in such a manner as to permit said containers to drop to the chute with the closed end forward to continue their movement down said chute.

7. The combination recited in claim 6 wherein said projections are attached to support arms, said support arms being coupled to a shaft which extends above and across said channels, and means for rotating said shaft at preselected intervals.

8. The combination recited in claim 1 wherein said reciprocating means includes a plurality of plungers and means for reciprocating said plungers in unison between forward and rearward positions for successively pushing said groups of containers into said receiving pockets.

9. The combination recited in claim 8 wherein each of said plungers comprises an upper horizontal wall means and a vertically disposed forward wall means, and further including a collection surface above which said plungers reciprocate and a discharge table disposed vertically below said collection surface and spaced therefrom, said pockets being located immediately above said table, said timing means being operative to deposit said containers initially on said horizontal wall means when said plungers are in said forward position, said containers dropping by gravity to said collection surface when said plungers are moved to said rearward position, said containers being subsequently thrust by said forward wall means of said plungers into said pockets and concurrently dropping by gravity onto said discharge table upon subsequent movement of said plungers to the forward position.

10. A machine for arranging randomly oriented containers comprising means for delivering a container from a storage bin to a chute, second means for vertically positioning said container, reciprocal means upon which said container is vertically positioned, stationary support means below said reciprocal means for receiving said container and upon which said container is momentarily stationary, and pocket means to which said container is directly delivered by said reciprocal means without stopping said continuously moving pocket means, and drive means for continuously moving said pocket means, said reciprocal means being a ram, said ram moving in a direction transverse to the direction of movement of said pocket means.

11. The combination recited in claim 10 wherein said pocket means includes an endless chain, and suitable generally horizontal structural means to support said container as it is transported in said pocket means.

12. The combination recited in claim 10 and further including motive means for moving said pocket means and delivering to said pocket means said container while said pocket means moves past said support means.

13. The combination recited in claim 12 and further including cam means for timing the movement of said reciprocal means relative to said pocket means.

14. The combination recited in claim 12 and further including a generally vertical wall means for restraining said container from moving backwardly and out of said pocket.

15. In a machine for placing containers in a moving path, the combination comprising support means for supporting said containers so that said containers are momentarily stationary, reciprocal means upon which said container is vertically positioned, continuously moving pocket means to receive said containers and position them in a moving path, and said reciprocal means delivering said containers from their stationary position on said support means directly to said continuously moving pocket means without stopping said continuously moving pocket means, said pocket means including several pockets secured to an endless chain and movable transverse to said additional means for delivering said containers from saie support means to said pocket means and suitable horizontal structural means to support vertically oriented containers as they are transported in said pockets.

16. The combination recited in claim 15 and further including motive means for moving said pocket means, said containers being received in said pockets as said pocket means moves past said additional means.

17. The combination recited in claim 15 and further including cam means for timing the movement of said containers into said pockets.

* * * * *